F. W. PUGSLEY.
PROCESS OF TREATING ORES.
APPLICATION FILED NOV. 23, 1911.
1,071,791.
Patented Sept. 2, 1913.
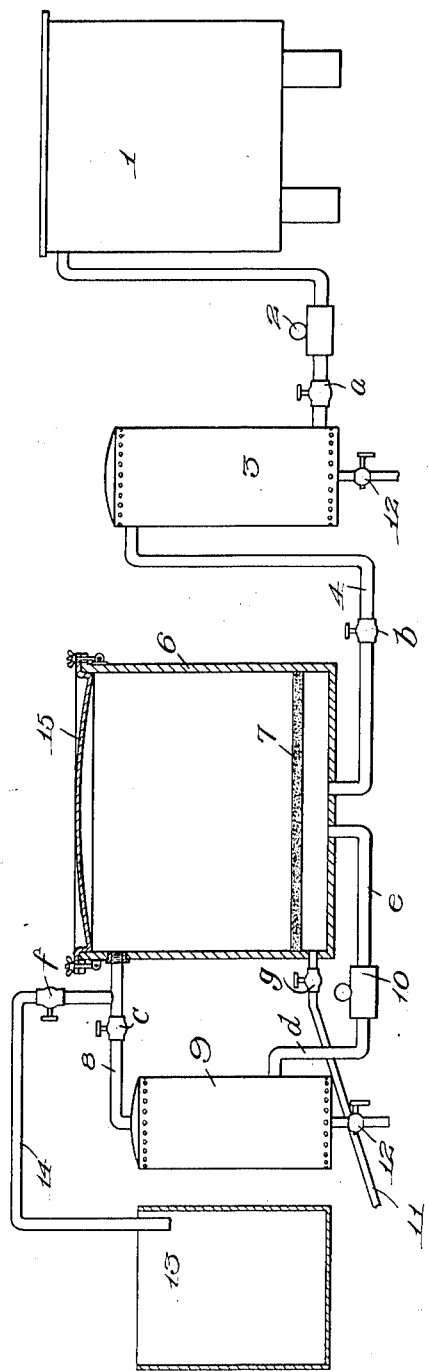
Witnesses
Nelson H. Copp
Inventor
FRANK W. PUGSLEY
By
his Attorneys

UNITED STATES PATENT OFFICE.

FRANK W. PUGSLEY, OF PITTSFORD, NEW YORK.

PROCESS OF TREATING ORES.

1,071,791.  Specification of Letters Patent.  Patented Sept. 2, 1913.

Application filed November 23, 1911. Serial No. 662,008.

*To all whom it may concern:*

Be it known that I, FRANK W. PUGSLEY, of Pittsford, in the county of Monroe and State of New York, have invented certain new and useful Improvements in Processes of Treating Ores; and I do hereby declare the following to be a full, clear, and exact description of the same, reference being had to the accompanying drawings, forming a part of this specification, and to the reference-numerals marked thereon.

My invention relates to an improved process for the extraction of metals from their ores, and more particularly for the chlorinization of that class of high grade silver ores containing in addition, such base metals as cobalt, nickel and arsenic.

Ores such as occur in the Nipissing district of Canada, and of the character mentioned, are very difficult of treatment by the known processes, and the recoveries of silver are very small, but I have discovered that by the use of the process hereinafter described over ninety per cent. of the silver values can be recovered from such ores at a relatively small cost.

To these ends, therefore, my invention consists generally in a process of treating ores contained or suspended in an aqueous solution, consisting in forcing through the solution in a finely divided state, a gas such as chlorin, which, by its chemical action upon some of the metals in the ore (such as the precious metals) will change them into a compound insoluble in the gas or in the solution in which it is produced, and will convert other metals (such as the base metals) into chlorids soluble in the solution in which the ore is suspended, and these dissolving off, the particles of the remaining precious metals, such as silver, leave them free and exposed to the action of the flowing gas; the mechanical action of the gas flowing through the solution in the form of bubbles, serving to agitate the ore particles sufficiently to bring all of them into contact with the gas and solution, and thus, by the action of a single agent, continuously convert the metals and remove the soluble and insoluble compounds.

More specifically stated, my improved process involves forcing through a mixture of the ore and water, chlorin gas in either fine streams or bubbles passing from the bottom of the tank upward, so as to agitate the ore and remove the soluble and insoluble compounds by the chemical and mechanical action of the converting gas itself.

In carrying out my invention, any suitable apparatus may be employed, such for instance as shown in the accompanying drawing illustrating a more or less diagrammatic view of an apparatus found to be practicable for the purpose.

Referring to the drawing, 1 indicates a suitable chlorin gas generator after the plan of the Townsden electrolytic generator; 2 a pump for drawing chlorin gas from the generator and forcing it into a suitable receiver such as 3, constructed of wood or of metal suitably lined with glass or other refractory material.

6 indicates a chlorinating tank constructed of wood or metal suitably lined, and having a tight fitting cover 15. At some distance above the bottom of the tank 6 is a false bottom, or diaphragm, 7, composed of material more or less porous, but which is of such a nature as to prevent the ready passage through it of solid material, although permeable to air and gases. The material known as silica sponge I find answers all purposes, and such bottom may be formed of one or more sections suitably joined together and supported at intervals to form a gas chamber in the bottom of the tank, and support the material or solution above it.

4 indicates a pipe line leading from the upper portion of the receiver 3 to the space beneath the diaphragm, or false bottom, 7, in which is interposed a suitable stop cock $b$. A suitable cock $a$ is also located in the pipe line between the pump 2 and the receiver 3.

9 indicates a gas receiver similar to the receiver 3, connected by a pipe 8 at its upper end with the upper portion of the tank 6, a suitable cock $c$ being located in this connection. The receiver 9 communicates by a pipe $d$ with a gas pump 10, the exit side of which is connected by a pipe e with the lower portion of the tank 6 beneath the false bottom 7.

12 indicates cocks located in the bottoms of the receivers 3 and 9 for drawing off any moisture which may collect in them.

13 indicates a tank containing a solution of caustic soda and into which extends a pipe 14 leading from the upper portion of the tank 6, or a branch of the pipe 8 and containing a cock f.

The operation is as follows: The ore to be treated is comminuted or finely pulverized and is deposited or held in suspension in water in the tank 6, but the solution must not, however, extend above the gas exit pipe 8, and the quantity of ore relative to the water must not be so great as to pack tightly at the bottom and prevent the gas from blowing or bubbling up through it. When the charge is ready the cover 15 is placed upon the tank and clamped down; the cock b is then opened from the gas receiver 3, which has been, or is being, filled from the generator by the gas pump 2. The gas passing into the chamber beneath the false bottom 7 is forced through the latter up through the ore solution in the form of minute bubbles, or streams, and the passage of these bubbles upwardly through the ore not only serves to mechanically agitate the mass, but the gas is brought in direct contact with all the particles of ore, converting the base metals into soluble chlorids upon which the water can act, and these falling away, or being dissolved, expose the precious metals to the action of the gas, which unites with them, forming insoluble chlorids, which are removed from the ore particles by the mechanical agitation, and so with each bubble of gas the process is continuous until it reaches the top of the tank. From the top of the tank the gas passes through the pipe 8 (the cock c being opened and the cock f closed) to the receiver 9, from whence it is or may be removed and again forced under the diaphragm or false bottom 7 by means of the gas pump 10 through the pipe e. If desired, a partial vacuum may be created in the receiver 9 in the first instance, so that the gas will pass through the ore solution either by suction or by pressure from the tank 3, or both, and it may be returned from the tank 9 as described. By the apparatus shown the gas can be circulated continuously until spent, being taken from the top of the tank and forced through the porous false bottom of the tank by means of the pump 10, and the receiver 3 used only to supply fresh gas when needed.

11 indicates a pipe connected with a suitable air supply leading to the bottom of the tank below the porous false bottom and controlled by a cock g, whereby, after the chlorinating is finished, the cock c may be closed, the cock f opened, and air admitted through the pipe 11 underneath the porous false bottom and is blown through the tank 6 in order to dispel all surplus gas before removing the cover 15. This surplus gas, or gas and air, passes into a caustic soda solution in the tank 13 and is dissolved, thus avoiding passing the gas into the air where it would be disagreeable to the workmen.

After the ore is chlorinated, the base metal chlorids dissolved in the water are removed by washing, and the insoluble gold and silver chlorids are leached out by a suitable chemical solution, such as sodium hyposulfite, which has the power of dissolving the precious metal chlorids; this leaching operation, however, forming no part of my present invention.

While I much prefer to employ a porous diaphragm or false bottom for the tank, through which the gas may be forced and pass upwardly through the ore solution, or the suspended ore, it will be understood that the gas could be caused to act upon the ore by placing pipes, having minute perforations, in the bottom of a tank having a solid bottom and forcing the gas into these and up through the liquid.

It will be understood that instead of employing two gas pumps as shown, one of these could be dispensed with and a single pump used to force the gas into the apparatus from the generator, and also to circulate it through the apparatus.

I claim as my invention.

1. The process of separating metals from ores, consisting in passing minute bubbles of chlorin gas upwardly through comminuted ore suspended in a liquid not of itself capable of reacting on the ore.

2. The process of chlorinating silver ores, consisting in passing chlorin gas under pressure through comminuted ore suspended in a liquid not of itself capable of reacting on the ore, the gas itself serving to mechanically agitate the ore and contact with the particles thereof to effect chemical combinations with some of the materials therein.

3. A process of treating ores containing different metals consisting in suspending the comminuted ore in a liquid which does not of itself affect the metals and then passing through said ore and liquid minute bubbles of a gas capable of entering into chemical combination with the metals and forming with some of them compounds insoluble in the liquid and gas and with others compounds soluble therein.

4. A process of treating ores containing precious and base metals consisting in suspending the comminuted ore in a liquid which does not of itself affect the metals and then passing through said ore and liquid minute bubbles of a gas capable of entering into chemical combination with the precious metals to form compounds insoluble in the liquids and of converting the base metals into compounds soluble in the liquid.

5. A process of treating comminuted ores consisting in suspending the ore in a liquid not of itself capable of chemically reacting on the ore and in mechanically agitating and causing chemical reactions in the ore and liquid by forcing through them finely divided streams of chlorin gas.

FRANK W. PUGSLEY.

Witnesses:
EDGAR L. FRANCIS,
FERD. GARRETSON.